July 11, 1933.  D. A. SILLERS  1,917,606
SEPARATOR
Filed April 11, 1930  3 Sheets-Sheet 1
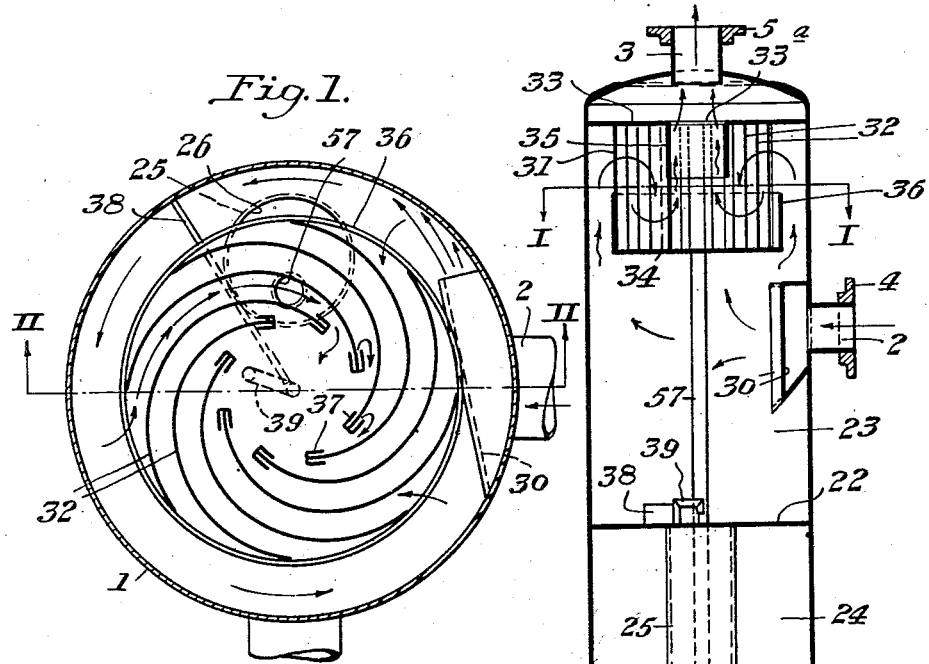
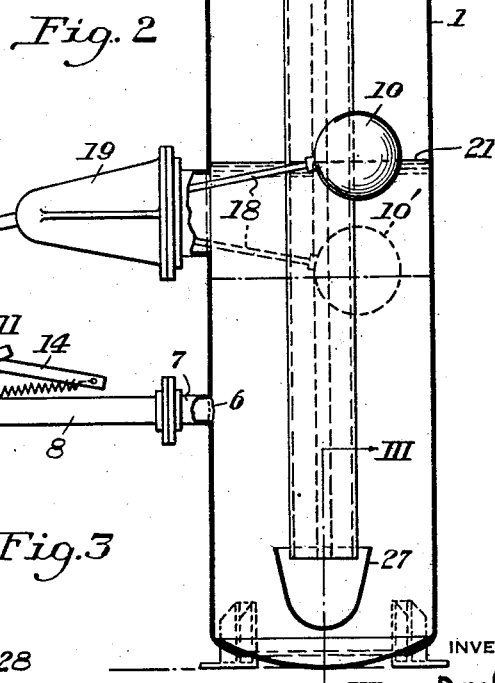
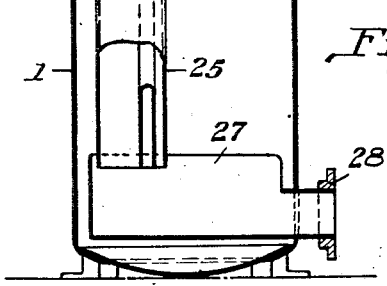
INVENTOR
Donald A. Sillers
by Byrnes, Stebbing Parmelee & Blenko
his Attorneys July 11, 1933.  D. A. SILLERS  1,917,606
SEPARATOR
Filed April 11, 1930  3 Sheets-Sheet 2

INVENTOR
Donald A. Sillers
by
Byrnes, Stebbins, Parmelee & Blenko
his Attorneys

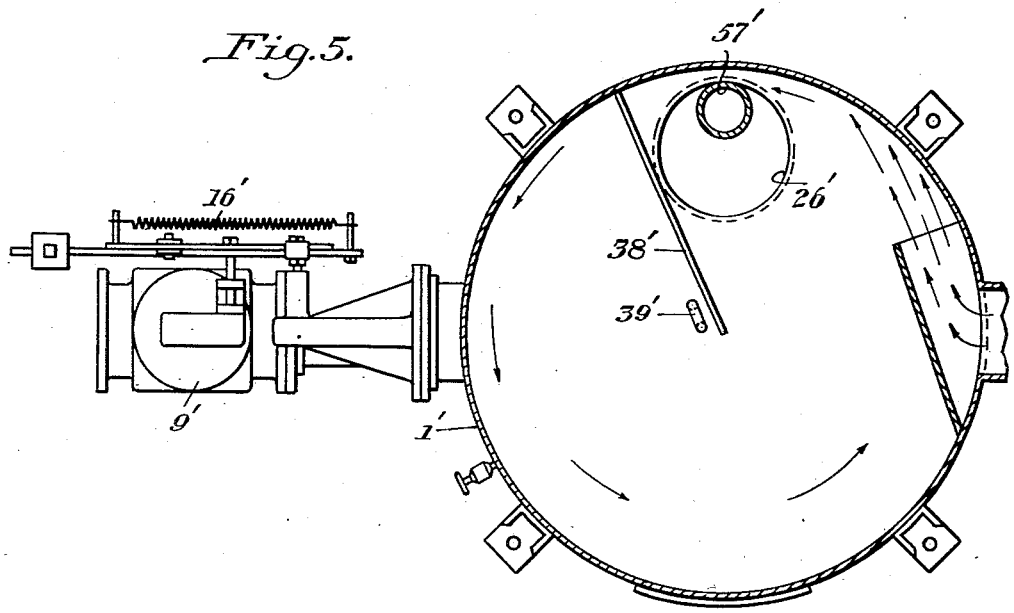
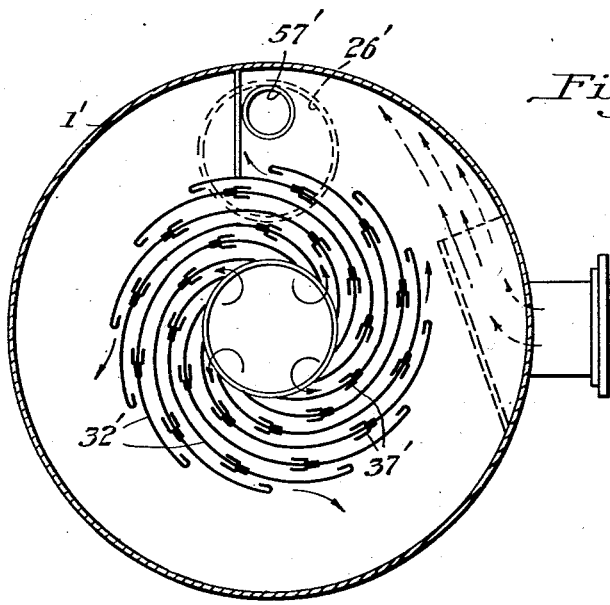

Patented July 11, 1933

1,917,606

UNITED STATES PATENT OFFICE

DONALD A. SILLERS, OF DALLAS, TEXAS

SEPARATOR

Application filed April 11, 1930. Serial No. 443,410.

My invention relates to separators, and more particularly to means for separating gas from the oil which comes from an oil well.

I provide an improved construction whereby gas is more efficiently and thoroughly separated from the oil than has been possible in prior devices. I also provide in an oil and gas separator means whereby sediment such as sand and dirt may be quickly and easily removed from the device.

Modifications of separators constructed in accordance with my invention are illustrated in the accompanying drawings, in which Figure 1 is a cross-sectional view of a separator taken on the line I—I of Figure 2;

Figure 2 is a vertical section of the separator taken on the line II—II of Figure 1;

Figure 3 is a vertical section taken on the line III—III of the lower part of the separator shown in Figure 2;

Figure 5 is a cross-sectional view of the separator shown in Figure 4, taken on the line V—V; and Figure 6 is a cross-sectional view of the separator taken on the line VI—VI of Figure 4.

Figure 4:
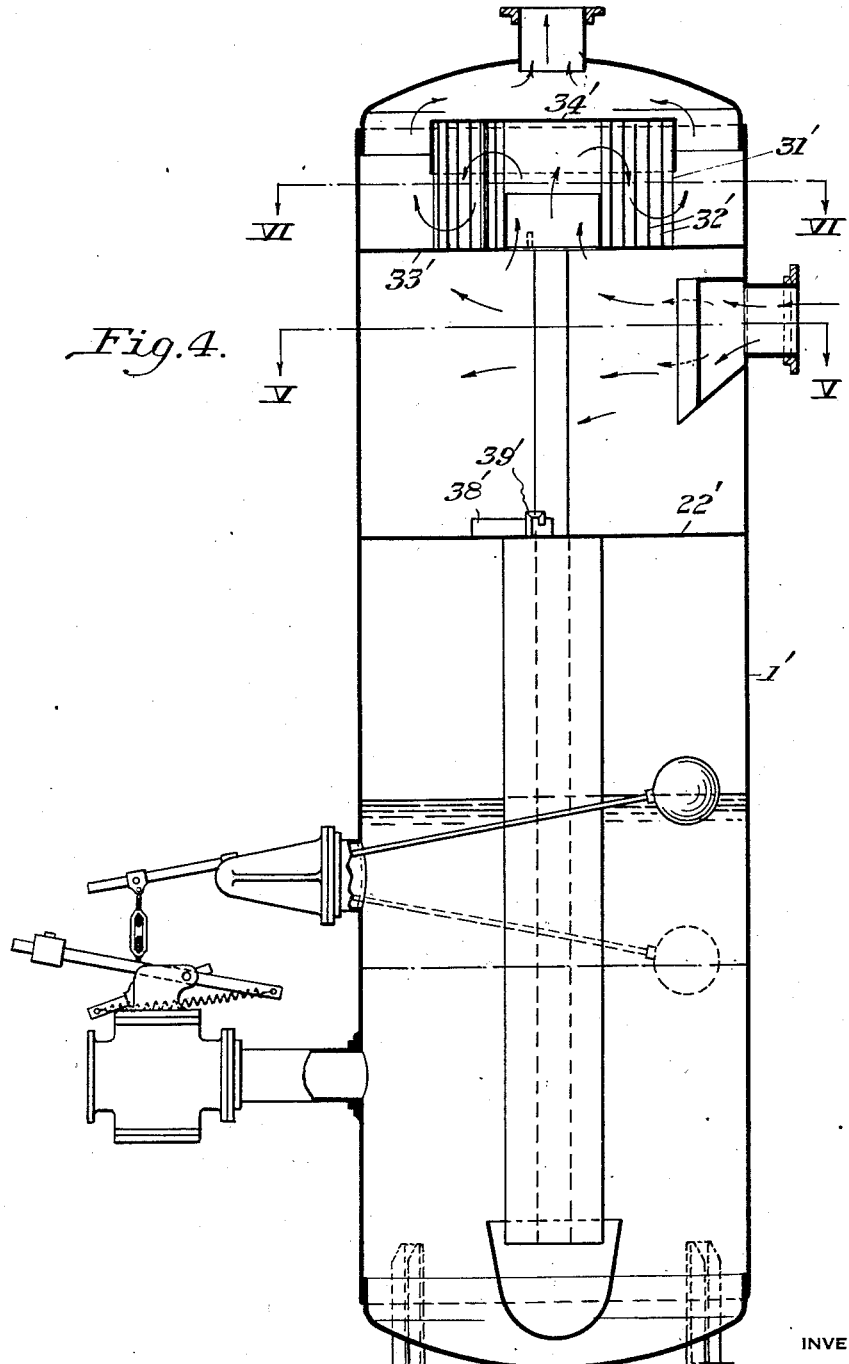
Figure 4 is a vertical section of another modification of the separator.

Referring to Figures 1 to 3, inclusive, a separator embodying my improvements comprises a vertical cylindrical tank or container 1 having an inlet opening 2 on the side thereof and an outlet opening 3 in the top. The inlet opening 2 is provided with a flanged conduit 4 for a connection with a pipe line and the outlet opening 3 is provided with a flanged coupling 5 for a connection to a gas main. An oil outlet opening 6 is provided in the lower part of the container 1 and this opening also has a flanged coupling 7 associated with it for connecting the opening 6 to an oil conduit 8 leading to an oil reservoir.

The amount of oil permitted to flow through the conduit 8 is controlled by a valve 9 that is in turn operated by a float 10 within the container 1 through a toggle mechanism 11.

The toggle mechanism 11 comprises a stationary bracket 12 having a shaft 13 upon which is journalled levers 14 and 15. The lower ends of the levers 14 and 15 are connected by a spring 16 which tends to draw the ends of the members 14 and 15 together. The upper end, as shown in the drawings of the lever 14, is provided with a transversely adjustable weight 17 for regulating the operation of the toggle mechanism 11.

The float 10 within the container 1 is provided with an arm 18 which is pivoted in a bracket 19 mounted on the container 1. The outer end of the arm 18 is connected to the lever 15 by an adjustable link assembly 20. The adjustable link assembly 20 permits the distance between the lever 15 and the outer end of the arm 18 to be increased or decreased in further adjusting the operation of the toggle mechanism 11.

The valve 9 is in an open position when the float is in the upper position illustrated in Figure 2. When the level of the oil 21 within the lower part of the container 1 falls below a certain position, for example, the position occupied by the float 10', the toggle mechanism 11 is caused to operate and close the valve 9 quickly.

A horizontal partition 22 is provided within the container 1 for separating the inside of the latter into an upper chamber 23 and a lower chamber 24. The lower part of the lower chamber 24 constitutes a reservoir for a certain amount of oil 21. A vertical conduit 25 connects an opening 26 in the partition 22 with the lower part of the chamber 24 below the oil outlet opening 6 in the container 1. Positioned underneath the end of the conduit 25 is a sediment-collecting receptacle or trough 27.

A pipe 39 is provided in the partition 22 for permitting gas entrapped above the oil 21 within the lower compartment 24 to escape. The pipe 39 extends above the top of the partition 22 and is provided with a downturned opening to prevent oil from entering the compartment 24 other than through the opening 26 and the conduit 25. The passage of the oil through the conduit 25 exclusively assures the collection of all sediment by the trough 27 rather than in the bottom of the container 1.

The chamber or compartment 23 above the partition 22 constitutes an oil-swirling chamber which, by imparting a circular motion to the gas-laden oil, initially separates the gas from the oil, the gas flowing upwardly from the center of the swirl and the oil flowing downwardly into the opening 26 through the conduit 25 and up into the reservoir of the compartment 24. A deflecting baffle 30 is mounted in front of the oil inlet opening 2 for directing the incoming oil around the circular wall of the compartment 23, as indicated by the arrows in Figure 1. This imparts the circular motion to the oil and initially separates the gas from the oil by centrifugal force.

The gas separated from the oil in the chamber 23 contains a certain amount of oil mist which is separated from the gas by a mist-extracting device 31 disposed in the upper part of the chamber 23. The mist-extracting device 31 comprises a plurality of spaced spiral vanes 32 that are held in position by means of upper and lower plates 33 and 34, respectively. The upper plate 33 is secured to the inner wall of the container 1 and is provided with an outlet opening 33ª in its center. The plate 33 is provided with a short conduit 35 which extends below and connects with the opening 33ª. The lower plate 34 is similarly provided with an upwardly-extending circular wall 36 which surrounds the outside of the vanes 32 and extends part way up the sides of the latter. The vanes 32 are provided with vertical-extending pockets 37 for catching the oil mist and extracting the oil from the gas.

As shown in Figures 1 and 2, the gas flows upwardly in the chamber 23 after it is separated from the oil and through the space between the wall 36 and the inner wall of the container into the spaces between the spiral vanes 32. Here the gas containing the oil mist is given a further swirling motion which separates the heavier oil particles from the gas by centrifugal force and by "wetting". The pockets 37 set up a turbulence in the mixture and cause it to be thrown against the side walls where the oil mist is liquefied. The pockets entrap the liquid and it is carried by gravity to the bottom of the extracting device 31. The natural tendency of the oil in the pockets to flow downwardly is assisted by the downward motion of the gas flowing in the spaces between the vanes 32. Such downward movement is produced by the position of the outer wall 36 and the inner wall 35. These walls act as baffles and force the oil mist to take a downwardly-extending path through the central portion of the extracting device. The upper baffle 35 also obviates the possibility of oil being thrown from the device into the gas stream.

A vertical pipe 57 connects an opening in the lower plate 34 of the extracting device with the trough 27 so that the oil tending to collect on the bottom of the extracting device 31 is drained off by the pipe 57 into the trough 27.

The partition 22 is highly important because it prevents the incoming oil from setting up a turbulent motion in the oil contained in the lower part of the compartment 24. The oil 21 is thereby maintained in a quiescent state which is conducive to gravitational settlement in the trough 27 of any sand or sediment that is contained in the oil. The trough 27 is of simple V-section and extends through the wall to the outside of the tank to facilitate the removal of the sediment with a simple tool such as a garden hoe. A suitable door or cover may be used to keep the open end of the trough closed.

The arrangement of the oil discharge pipe 25 discharging under the oil level into the horizontal trough 27 provides means whereby the sand or dirt may be separated from the oil and easily removed from the container. This arrangement precludes the possibility of dirt or sand passing through the valve 9 and thereby wearing out the latter. The passage of foreign matter through the very narrow openings of the valve 9 causes a wearing of the valve and valve seats, commonly known as "wire-drawing", which results in a worn valve and a valve seat which will not tightly close and shut off the flow of oil when desired. My improved construction prevents the possibility of foreign matter injuring the valve 9.

The float-operated toggle mechanism 11 insures that the valve 9 remains closed until the oil level in the separator has raised the float 10 to such a position that the lever 15 passes the center line of the lever 14, which causes the spring 16 to move the lever 15 to a position which opens the valve 9. When the opening of the valve has sufficiently reduced the oil level so that the float is lowered until the arm 15 has passed the center line of arm 14, the arm 14 is moved to a position which closes the valve.

Returning to the mixture of oil and gas in the first separating chamber 23, the oil is diverted around the inside of the shell of this chamber and because of its greater weight is thrown to the outer side of the chamber against the wall and thence downwardly into the conduit 25. The gas leaves the oil because of its lighter weight and rises toward the upper part of the first chamber 23. Because of the turbulence of the mixture, the separation is not complete in the first separating chamber 23 and the gas passes through the mist-extracting device 31, which removes any remaining oil in the gas and the clean gas passes up and out of the gas discharge opening 3.

Referring to Figures 4 to 6, inclusive, there is illustrated another modification in which the mist-extracting device 31' is turned upside-down as compared with the separator illustrated in Figure 2. Here the plate 33' is the bottom of the device, and the plate 34' is the top of the device. The spaced spiral vanes 32' as shown in Figure 6 are provided with a plurality of spaced staggered vertical pockets 37' having their openings arranged so as to set up a turbulence in the mixture and increase the "wiping" of the mixture on the walls of the passages. In this case too, the ends of the vanes 32' are cupped over to form vertical end pockets. The rest of the construction of the oil and gas separator illustrated in Figures 4 to 6, inclusive, is similar in construction and operation to that described above in connection with the modification illustrated in Figures 1 to 3, inclusive, except that the mixture flows outwardly instead of inwardly.

As shown in Figure 5, the partition 22' is provided wtih a baffle plate 38' which is positioned in back of the opening 26' for backing up the oil and causing it to flow into the opening 26'.

A similar baffle plate 38 is used in the separator illustrated in Figure 2 for the same purpose.

A certain amount of gas is dissolved and held in suspension in the oil accumulating in the bottom of the reservoir of the separator. It is desirable that this gas which gradually rises to the top of the oil will pass upwardly through the partition 22 and into the general stream of gas flowing through the mist extractor and out of the gas outlet. This is accomplished by means of the vapor outlet pipe 39' which permits the escape of gas from the top of the oil reservoir into the first separating chamber. It is turned down so that the oil entering the separating chamber will not run down into the reservoir without first going through the conduit 25.

While I have disclosed present preferred embodiments of my invention, it is to be understood that the same is not limited thereto, but may be otherwise variously embodied within the scope of the following claims.

I claim:

1. A separator comprising a vertical cylindrical tank, partitions dividing said tank into a central separating chamber, an upper mist-extracting chamber and a lower sediment-collecting chamber, said separating chamber having an inlet opening with means associated therewith for causing the liquid and gas to be separated to be moved at a high speed around the circular wall of the separating chamber, whereby the liquid is separated from the gas by centrifugal force, the liquid passing downwardly into the sediment-collecting chamber and the gas passing upwardly into the mist-extracting chamber, said sediment-collecting chamber consisting of a liquid reservoir, means for maintaining the level of the liquid in the reservoir at a predetermined level, and means for conducting the liquid from the separating chamber to the sediment-collecting chamber comprising a conduit extending below the surface of the liquid in the reservoir and said mist-extracting chamber consisting of a plurality of spaced vertical spiral vanes having transverse liquid-collecting pockets on the sides thereof, and means for causing the gas to take a downwardly-extending path in the spaces between the spiral vanes, and means for discharging liquid from the mist-extracting chamber into the liquid reservoir below the surface of the liquid.

2. A separator comprising a vertical cylindrical tank, partitions dividing said tank into a central separating chamber, an upper mist-extracting chamber and a lower sediment-collecting chamber, the separating chamber having an inlet opening with means associated therewith for causing the liquid and gas to be separated to be moved at a high speed around the circular wall of the separating chamber, whereby the liquid is separated from the gas by centrifugal force, the liquid passing downwardly into the sediment-collecting chamber and the gas passing upwardly into the mist-extracting chamber, said sediment-collecting chamber consisting of a liquid reservoir, means for maintaining the level of the liquid in the reservoir at a predetermined level, and means for conducting the liquid from the separating chamber to the sediment-collecting chamber comprising a conduit extending below the surface of the liquid and the reservoir, and said mist-extracting chamber consisting of a plurality of spaced vertical directing vanes having transverse liquid-collecting pockets on the sides thereof, and means for causing the gas mixture to take a central path through the directing vanes, whereby the tendency of the liquid to impinge against the top of the chamber is obviated, means for discharging liquid from the mist-extracting chamber into the liquid reservoir below the surface of the liquid, and means for discharging the gas from the mist-extracting chamber.

3. A separator comprising a vertical cylindrical tank divided by a horizontal baffle plate into a liquid and gas separating chamber and a sediment collecting chamber, said separating chamber having an inlet opening and a gas outlet opening, a baffle adjacent the inlet opening for directing liquid and gas entering through the inlet opening around the inner wall of the separating chamber, a vertically extending conduit leading from the separating chamber to the collecting chamber, said conduit being offset from the center of the separator, a conduit leading from the collecting chamber through which the liquid may be discharged, means for maintaining the surface of the liquid in the collecting chamber above the points where said conduits open into the collecting chamber, and a trough under the end of the conduit leading from the separating chamber to the collecting chamber for collecting solid matter, said trough extending horizontally to a point without the tank.

4. A separator comprising a vertical cylindrical tank divided by a horizontal baffle plate into a liquid and gas separating chamber and a sediment collecting chamber, said separating chamber having an inlet opening through which liquid and gas are introduced into the separator and a gas outlet opening, a vertically extending conduit leading from the separating chamber into the collecting chamber, said conduit being offset from the center of the separator, a conduit leading from the collecting chamber through which the liquid may be discharged, means for maintaining the liquid level in the collecting chamber above the points where said conduits open into the collecting chamber, and a mist extractor in the separating chamber above the inlet opening having openings connecting with the separating chamber and having an outlet opening adjacent the gas outlet opening of the separating chamber, said mist extractor comprising a plurality of spaced vertical spiral vanes having transverse liquid collecting pockets in the sides thereof, and means for causing the gas to take a downwardly extending path in travelling between the spiral vanes.

5. A separator comprising a vertical cylindrical tank divided by a horizontal baffle plate into a liquid and gas separating chamber and a sediment collecting chamber, said separating chamber having an inlet opening through which liquid and gas are introduced into the separator and a gas outlet opening a vertically extending conduit leading from the separating chamber into the collecting chamber, said conduit being offset from the center of the separator, a conduit leading from the collecting chamber through which the liquid may be discharged, means for maintaining the liquid level in the collecting chamber above the points where said conduits open into the collecting chamber, a mist extractor in the separating chamber above the inlet opening having openings connecting with the separating chamber and having an outlet opening adjacent the gas outlet opening of the separating chamber, said mist extractor comprising a plurality of spaced vertical spiral vanes having transverse liquid collecting pockets in the sides thereof, and means for causing the gas to take a downwardly extending path in travelling between the spiral vanes, and a conduit leading from the mist extractor to the collecting chamber adapted to discharge liquid from the mist extractor into said chamber below the level of the liquid therein.

In testimony whereof I have hereunto set my hand.

DONALD A. SILLERS.